United States Patent [19]

Cho et al.

[11] 3,809,903
[45] May 7, 1974

[54] RADIATION GAUGE

[75] Inventors: Boong Y. Cho, Columbus, Ohio;
Elmer W. Sturkol, Wakefield, Mich.; Keith E. Wier, Columbus, Ohio

[73] Assignee: Industrial Nucleonics Corporation, Columbus, Ohio

[22] Filed: Dec. 1, 1971

[21] Appl. No.: 203,757

[52] U.S. Cl. ............... 250/358, 250/374, 250/505
[51] Int. Cl. ....................... H01j 39/28, H01j 37/20
[58] Field of Search .......... 250/51.5, 83.3 D, 106 S

[56] References Cited
UNITED STATES PATENTS

| | | | |
|---|---|---|---|
| 3,373,286 | 3/1968 | Han | 250/83.3 D |
| 3,448,264 | 3/1969 | Rhodes | 250/83.3 D |
| 3,100,261 | 8/1963 | Bigelow | 250/51.5 |
| 3,488,502 | 1/1970 | Dukes | 250/106 S |

*Primary Examiner*—James W. Lawrence

[57] ABSTRACT

A radiation transmission gauge to measure during manufacture the low atomic number, non-homogeneous, large thickness materials, such as fiberglass, using primarily the radiation photoelectric effect. The gauge source-detector geometry provides monoenergetic X-rays in the 14–30 KEV range, produced by a primary source of gamma radiation of higher energy, through fluorescence of a target. The radiation detector uses Krypton gas and the target material is selected to produce a fluorescence radiation that is above and substantially close to the K-edge of the Krypton gas. Other features of the source-detector geometry minimize the presence of the primary source radiation, to improve gauge accuracy.

6 Claims, 6 Drawing Figures

INVENTORS
BOONG Y. CHO
ELMER W. STURKOL
KEITH E. WIER

BY William T. Fryer III
ATTORNEY

RADIATION GAUGE

BACKGROUND

This invention relates to radiation transmission gauges for certain materials that have been difficult to measure accurately during manufacture.

In a typical radiation transmission gauge the source of radiation passes through the material as it is being processed during manufacture, and the radiation is attenuated. The radiation detected at the opposite side can be correlated with the thickness or weight per unit area of the material, terms used interchangeably here.

Examples of such materials that have not been measured effectively before are fiberglass and mineral wool, such as used for furnace filters. These materials are generally defined by their low atomic number, non-homogeneous composition, large thickness, and the dirt and other contamination present during manufacture (a very significant fact from a gauging point of view). A monoenergetic source is desired, i.e., a source with essentially only one energy, so that no significant other radiation components can produce backscatter or other effects from the material or source-detector geometry, that would change the gauge calibration.

X-ray sources have been used to measure a material property, such as coating weight, by fluorescence techniques. The X-rays were generated by a source that utilized gamma radiation from a target of selected material. A detector was used to respond to the X-rays. U.K. patent 997,338, published July 7, 1965 describes such an arrangement.

Other gauges for traveling sheet materials have been constructed to utilize a broad band of Bremsstrahlung (Brem) radiation, generally as a practical matter with an average energy above 100 KEV for certain materials. The Brem radiation is generated by the irradiation of a target with beta radiation from a radioisotope. The detector could respond more significantly to a particular part of the wide band radiation range by use of an ionization chamber and a preselected inert gas, such as Krypton. The energy selection was based on the atomic weight of the selected inert gas and the detector window acting as a radiation filter at low energies. U.S. Pat. No. 2,933,606 shows such a gauge design.

A gauge for high atomic number and thick materials, like steel, has been built using Americium-241, a radioisotope emitting primarily gamma energy at 60 KEV, and an ionization chamber detector with Xenon gas. The Xenon gas was selected because it had a higher absorption coefficient for the 60 KEV radiation.

A collimation technique has been used in a radiation gauge to improve accuracy in measuring property of a traveling sheet during manufacture. Flutter, the movement of the sheet can cause serious effects unless the gauge source-detector geometry is properly designed. Collimators have been used as in U.S. Pat. No. 3,373,286, issued Mar. 12, 1968; and U.K. patent 638,968, published June, 1950.

A source construction for a particulate material has utilized a storage chamber for gases produced by radioactive decay, referring to U.S. Pat. No. 3,488,502, issued Jan. 6, 1970.

SUMMARY OF THE INVENTION

The present invention achieves a more accurate measurement of a property of certain materials during manufacture, using monoenergetic X-rays with a source-detector geometry that tends to minimize undesirable effects on the gauge measurement. A monoenergetic source is desired, i.e., a source with essentially only one energy, so that no significant other radiation components can produce backscatter or other effects from the material or source-detector geometry, that would change the gauge calibration.

The invention utilizes radiation in the range of 14 to 30 KEV, to rely primarily on the photoelectric effect of the radiation on materials characterized by low atomic number, non-homogeneous and large thickness. The radiation is produced by a source that has a target fluorescing in the above-mentioned range when irradiated by a primary source of higher energy gamma radiation.

The source-detector geometry is designed so that the gauge output is primarily responsive to the weight per unit area of the material and substantially free of the effects due to the primary, gamma radiation. The radiation detector is an ionization chamber with Krypton gas and the target material is selected to fluoresce at an energy above and substantially close to the K-edge of the Krypton gas. The fluorescence radiation is passed through collimator apertures that will absorb the primary radiation striking the collimator walls.

With certain spacings of detector and source the gauge uses collimators on the primary source, to permit radiation to strike the target and not be directed toward the detector, while not significantly interfering with the fluorescence radiation from the target.

DESCRIPTION OF THE PREFERRED EMBODIMENT

Figure 2:
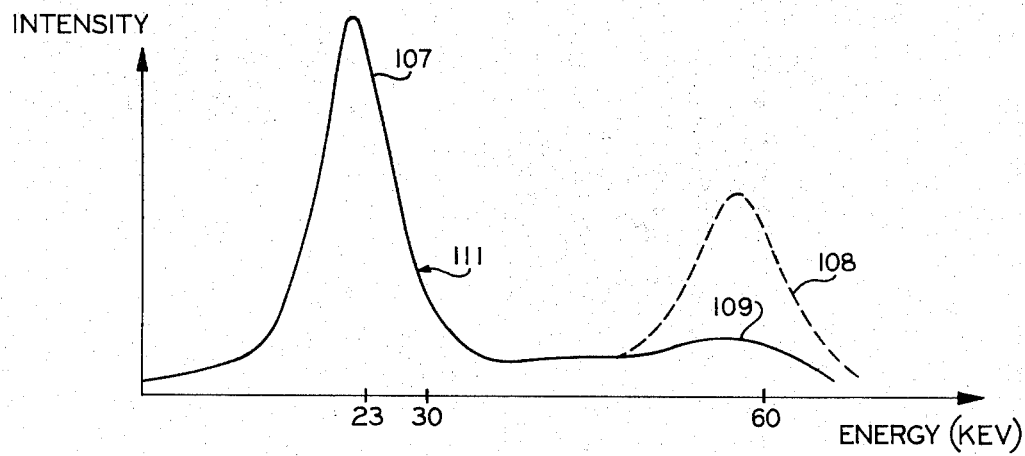
FIG. 2 is a graph illustrating the low energy fluorescence spectrum as provided by a source arranged in accordance with the present invention.

The need for a properly designed monoenergetic X-ray source and detector geometry is best explained by considering the source intensity versus energy curve 111 of FIG. 2, obtained by a spectrum analyzer. The energy that produces the most sensitive measurement for materials like fiberglass is represented by the monoenergetic, secondary X-ray peak 107, at approximately 23 KEV. Monoenergetic X-rays in the range of 14 to 30 KEV produce primarily a photoelectric interaction with these materials, making the gauge sensitive to variations of weight per unit area while not as sensitive to non-homogenuity and density that would affect the gauge accuracy. The primary radiation energy that produces the secondary radiation is at approximately 60 KEV, for a primary source of Americium-241. The X-rays that leave source 1 should be as free as possible of the primary and scattered radiation. There will be undesirable interactions in the traveling sheet material and with the source-detector geometry materials if the source is not within the range of 14 to 30 KEV. Flutter will increase these effects.

As a practical fact there will be some backscatter radiation and the primary radiation will come out unless suitable steps are taken to minimize it while at the same time not significantly reducing the secondary radiation. Curve 108 (in dotted lines) is used for illustration purposes only to show a radiation source that has too high a primary radiation intensity and would cause undesirable radiation interactions and effects. One of the achievements of gauge 100 is the reduction of primary radiation from source 1 to the intensity represented for illustration purposes only by peak 109. The reduction is accomplished by several features that combine to achieve this result.

Figure 1:
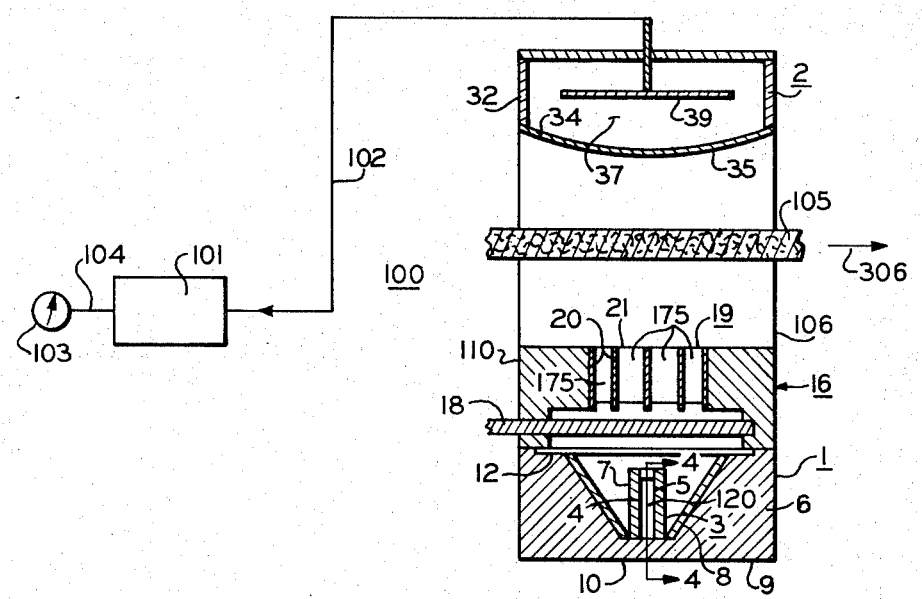
FIG. 1 is a sectional view of a source and detector geometry which embodies various features of the present invention.

One embodiment of a gauge 100 in accordance with the present invention is shown in FIG. 1 and comprises a low energy source 1 in axial alignment with a radiation detector 2. The output of detector 2 is coupled to a signal processing unit 101 of conventional design, through line 102 and meter 103 is coupled to the output of signal processor unit 101 over line 104. Meter 103 is calibrated with samples of the traveling sheet material 105 (moving in the direction of arrow 306) to indicate the material weight per unit area.

Sheet 105 may be fiberglass, and the weight per unit area is being measured as the material is produced, to adjust the process if the weight per unit area is not at a desired value. Sheet 105 may have flutter, since some industrial processes suspend the sheet between wide spaced rolls or have sheet tension changes. The flutter can change the detector output, looking like a weight per unit area change. The detector 2 and source 1 are mounted in a frame 106 that holds them in relative fixed position with respect to each other.

Figure 4:
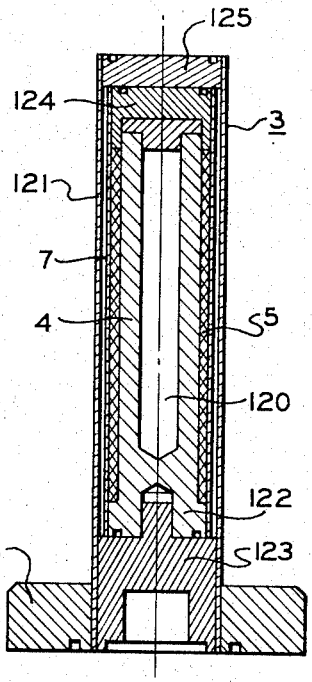
FIG. 4 is a sectional view along the lines 4—4 of FIG. 1, showing one embodiment of the primary source.

The source 1 has a primary source 3 which in simplified form consists of a hollow metal cylinder 4 which serves as a substrate for the radioactive material 5 which is attached to its outer surface. The metal cylinder 4 is secured to the metal source base 6. The outer surface of the radioactive material 5 is sealed by steel foil 7. As the radioactive material 5 decays, the resultant gases pass into the hollow center 120 of the metal cylinder 4 through the wiping contact spacing in the metal joints. The radioactive material is substantially sealed to prevent the decay gas from escaping to the outside. Shown in FIG. 4 is the outer cylindrical window 121 concentric with the cylinder 4 and the foil 7 for hermetically sealing the source 3 with plugs 123 and 124 and base 6 at one end and plugs 124 and 125 at the other end. The preferred radioactive material 5 is Am-241 with a 458 year half-life and a primarily 60 KEV gamma emission. The outer cylindrical window 121 would be sufficiently thin to allow transmission of the gamma emission, which serves as the primary radiation.

A secondary emitting target material 8 is shown in FIG. 1 to be conical in shape and to be surrounding the primary source 3 with its narrow end located at the base of the source 3 and its inclined portion extending towards the direction of the intended radiation. One surface of the target 8 is adjacent to the inner surface of the base 6 and the other surface of the target 8 is exposed to the primary radiation emitted from the source 3. The secondary material 8 acts as a target from which a low energy X-rays are fluoresced upon receiving the primary radiation. The secondary material is of silver having an approximate energy for K to L shell transition of 23 KEV. Other elements having energies for K to L shell transitions in the 14 to 30 KEV range and suitable for practicing the invention are zirconium, niobium, molybdenum, ruthenium, rhodium, palladium, tin, cadmium, and antimony. Yttiium, technetium, indium, tellurium, iodine, and Xenon, can be used, but they are extremely difficult to obtain commercially, or have other practical limitations. The K to L shell transition of each of these elements is responsive to the primary 60 KEV gamma emissions from the source 3 to produce a substantial low energy X-ray fluorescence yield in the 23 KEV range. An alternative radioactive material 5 for providing the primary radiation emission for absorption by the K-edge of the material 8 and a low secondary energy in the 20 KEV range would be Pb-210, having a 22 year half-life and a 47 KEV gamma emission.

The inclined portion of the target 8 extends in relation to the longitudinal axis of the primary source 3 at an angle of approximately 37°. The target 8, in FIG. 1, is covered with a beryllium window 12, which is attached to the base 6.

A housing 16 is attached to the base 6 to provide a slidable steel shutter 18 which contains the emitted radiation with the source 1 is not to be in use. The housing 16 also contains a collimator 19 which reduces stray radiation and prevents some of the scattered radiation from the primary source 3 from reaching the ion chamber 2. The collimator 19 is of a material having a medium to high atomic number such as iron, brass, steel, copper, and zinc, or lead to absorb the primary radiation striking the collimator aperture walls. Collimator 19 consists of a plurality of concentric cylinders 20 joined by a number of thin planes 21 lying along the radial loci of the cylinders 20 to form apertures 175. The collimator 19 is in axial alignment with the source 1. Housing 16 has a head 110 made of a material like steel that absorbs the primary source radiation, to prevent primary radiation scattered from detector 2 or material 105 from being fed back and rescatter, setting up a feedback regeneration effect.

The detector 2 is an ionization chamber also positioned in axial alignment with the source 1 and at a distance of approximately 18 inches from the source 1. The chamber 2 detects the secondary emissions of radiation produced as a result of fluorescence of the material 8 located within the source 1. The detector 2 consists of a housing 32 which forms a cavity that is directed toward and exposed to the source 1. A window 34 of aluminum is mounted on the housing 32 by means of a steel grid 35 to seal the cavity within the housing 32. The cavity 37 is filled with Krypton gas having a pressure of 30 psig and a 2 inch depth. At this gas pressure and depth, the chamber is 95 percent efficient at 23 KEV and only 10 percent efficient at 60 KEV. Thus, the Krypton gas is responsive primarily to the low energy X-rays and it serves essentially as an energy selector. Detector 2 in this arrangement provides a K-edge response to radiation at 14.3 KEV. Scattered radiation below 14.3 KEV are descriminated against sharply. The X-rays below 14.3 KEV could be from scattering by materials used in the gauge, such as lead or tungsten. An aluminum probe 39 is situated within the chamber 37 and is responsive to the ionization of the Krypton to produce a signal representative of the intensity of low energy radiation absorbed by it.

Figure 5:
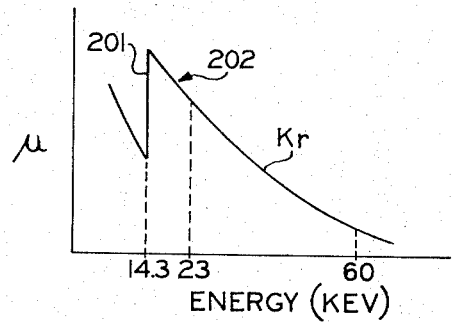
FIG. 5 shows part of the absorption curve for Krypton gas, illustrating the K-edge response.
Figure 6:
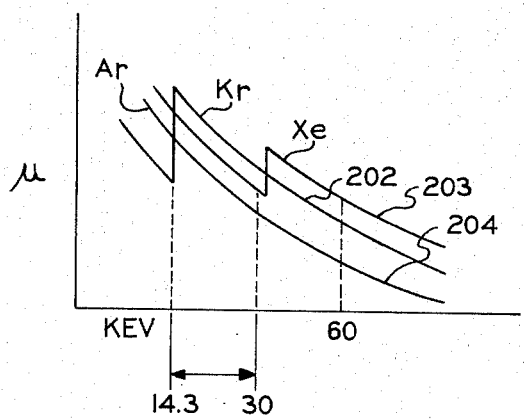
FIG. 6 shows part of the absorption curve for Argon, Krypton and Xenon gases, illustrating the K-edge response.

The use of Krypton as the detecting gas and the detector arrangement provides the requirement of selective absorption for the preferred embodiment. FIG. 5 is used only to illustrate the mass absorption coefficient, $\mu$ of the Krypton over an energy range, by curve 202. The K fluorescence energy of silver is 23 KEV and the primary source radiation energy is 60 KEV. FIG. 6 shows the mass absorption curves 202 and 203, for Krypton and Xenon gas, respectively, and a portion of the absorption curve 204 for Argon gas. There is significant response with the Krypton gas to the 23 KEV energy and a very great discrimination of the primary source 60 KEV radiation and scattered radiation produced thereby. The Argon gas would give much greater response to the lower energy X-rays below 14.3 KEV. The range 14.3 to 30 KEV falls below the K-edge of Xenon.

The Krypton gas K-edge is 14.3 KEV. Thus, the preferred embodiment teaches the feature of the invention that the target material 8 has a fluorescence energy level of between 14.3 and 30 KEV, relatively close to and greater than the K-edge of the Krypton detecting gas and the K-edge response of the detector, but substantially less than the primary radiation energy level.

The optimum combination of response is achieved, with a sufficiently low response to the primary radiation, a substantial response to the low energy X-rays, and sharp discrimination against scattered X-rays below the desired radiation measuring range.

In FIG. 2 curve 107 (solid line) is the monoenergetic, low energy X-ray spectrum which is developed by the source shown in FIG. 1, obtained from a spectrum analyzer. The spectrum has essentially one peak which is at the 23 KEV energy level and is of a high and sufficient energy to be effectively used to measure the weight per unit area of the materials of large thickness, non-homogeneous, and low atomic number moving between the source 1 and the detector 2.

Figure 3:
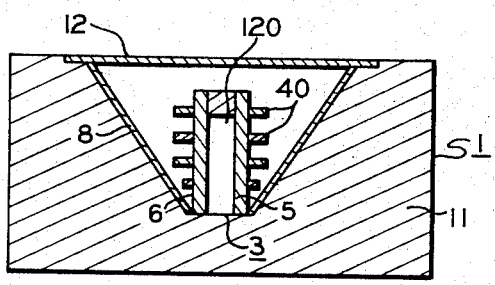
FIG. 3 is a sectional view of the source embodying a plurality of concentric discs as additional collimation which shows additional features of the present invention.

For smaller separation between the source 1 and the detector 2, additional collimation may be necessary for an effective utilization of the source and detector configuration. As shown in FIG. 3, a plurality of steel or brass discs or rings 40 are attached to the primary source 3, in concentric and orthogonal relationship to it and spaced longitudinally thereon. The rings 40 are of sufficient radii to collimate the primary energy to the target 8 and to limit the primary radiation from reaching detector 2, but the rings do not extend so far as to substantially interfere with the fluorescence radiation of the target material 8 or the passage of the fluorescence radiation to detector 2.

Obviously, many modifications of the present invention are possible in light of the above teaching. It is therefore to be understood that, in the scope of the appended claims, the invention may be practiced otherwise than as specifically described.

We claim:

1. A radiation gauge for measuring the weight per unit area of non-homogeneous, large dimension traveling sheet materials, like fiberglass, during manufacture, comprising a 14 to 30 KEV monoenergetic X-ray source, said X-ray source comprising
 a primary source of gamma ray emitting radioactive material,
 said primary material being shaped in the form of an elongated member,
 a target material shell spaced from and positioned about and substantially extending along the full length of said primary source and having one end spaced closer to one end of said primary source and its other end spaced further from said primary source to direct radiation toward the intended direction of emission,
 said target material being responsive to the primary radiation emanating from said primary material to fluoresce a secondary, substantially lower energy X-rays;
an ionization chamber detector means spaced from said X-ray source and positioned to receive said secondary radiation after passing through said material, said ionization chamber containing Krypton gas and producing a substantial K-edge response;

said target material and primary source being selected to produce fluorescence X-rays of an energy greater than and substantially close to the K-edge of said Krypton gas, and substantially removed from said primary source energy;
a collimator means disposed between said X-ray source and said traveling sheet material and comprising a frame with passage walls forming apertures that permit said X-rays to pass through said apertures to said traveling sheet material and substantially absorbs the primary source radiation that impinge on said frame walls;
signal processing means coupled to said detector means to provide a signal responsive primarily to the weight per unit area of said material.

2. A radiation gauge as set forth in claim 1, wherein, said primary source is Americium-241;
said target material is silver; and
said X-ray source radiation energy is substantially 23 KEV.

3. A radiation gauge as set forth in claim 1, wherein, said target shell is conical and is positioned concentrically about, having its narrower end at one end of said primary source and having its other end directed toward the intended direction of emission, and substantially extending the full length of said primary source;
said primary source comprises a radioactive material that produces a gas from radioactive decay and is formed as a cylindrical shell on the surface of a tubular member;
said primary source shell being enclosed by a shield means that has a shield member with low gamma ray absorption adjacent to said target material and allows escape of gases caused by any radioactive decay from said primary source substantially to said tubular member cavity.

4. A radiation gauge as defined in claim 1, wherein said X-ray source has a head that mounts said collimation means and faces said material, said head being of a material that substantially absorbs the primary source radiation returning from said material and said detector means.

5. A radiation gauge as defined in claim 1, wherein said collimating means further comprises at least one shield member disposed on said primary source member, to direct said primary radiation to said target and attenuate primary radiation in the direction of said detector means, and not substantially attenuate said secondary radiation directed to said detector means from said target.

6. A radiation gauge as defined in claim 5, wherein said shield member is one of several spaced rings disposed concentric to and orthogonal with said primary source length, extending out to absorb primary source radiation directed to said radiation detector means and not far enough out toward said target to absorb substantially said secondary radiation directed to said radiation detector means.

* * * * *